March 27, 1962   J. JORDAN   3,026,762
THREE PART BRAIDED GROMMET AND METHOD OF MAKING THE SAME
Filed Oct. 9, 1959
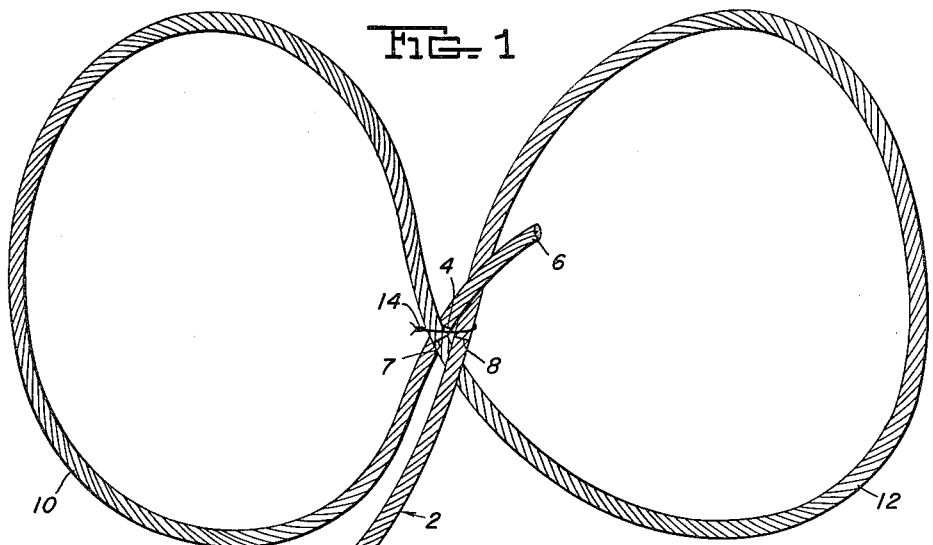
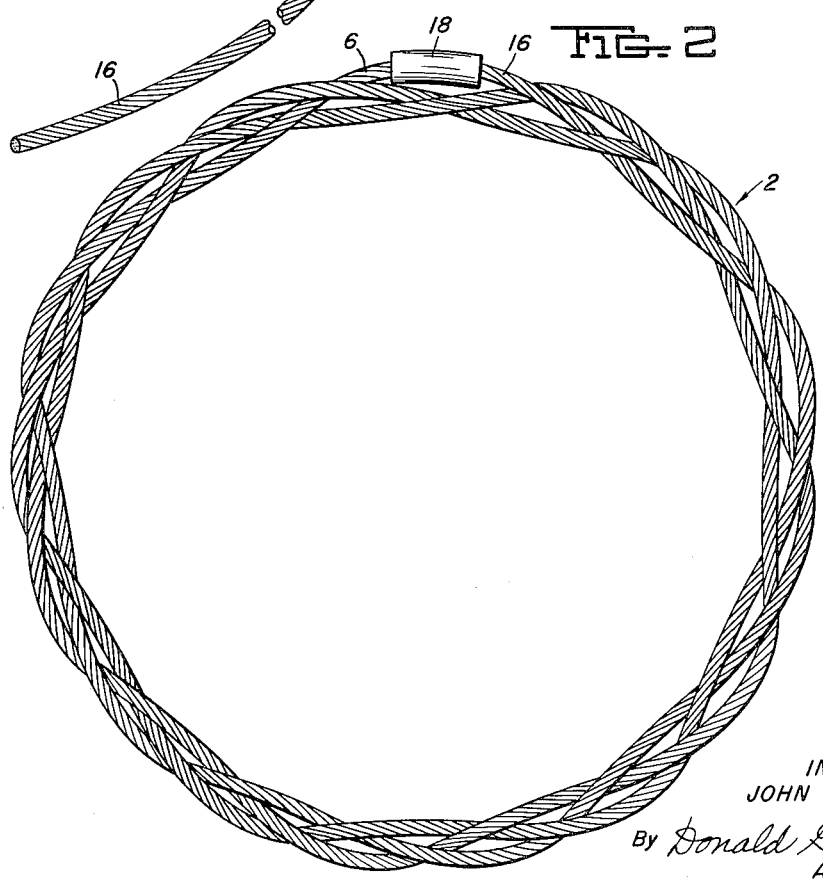
INVENTOR
JOHN JORDAN
By Donald G. Dalton
Attorney 3,026,762
THREE PART BRAIDED GROMMET AND
METHOD OF MAKING THE SAME
John Jordan, West Haven, Conn., assignor to United States Steel Corporation, a corporation of New Jersey
Filed Oct. 9, 1959, Ser. No. 845,416
3 Claims. (Cl. 87—8)

This invention relates to a three part braided grommet and to a method of making the same, and more particularly to such grommets made of a single length of wire strand or rope. Grommets may be constructed in various manners. The simplest form is a single wire or strand formed into a loop with the ends fastened together. Others, such as shown in Carnagy Patent No. 654,225, dated July 24, 1900, and Beyea Patent No. 1,522,797, dated January 13, 1925, are made from one or more lengths of wire or strands with a center core and other lengths of material twisted around the center core. These grommets are not completely satisfactory. They may not be flexible enough for some purposes and/or they may be difficult and expensive to manufacture.

It is therefore an object of my invention to provide a grommet which is flexible, strong, inexpensive and which can be rapidly made.

Another object is to provide a method of making such a grommet.

These and other objects will be more apparent after referring to the following specification and attached drawings, in which:

FIGURE 1 shows one step in the method of producing the grommet; and

FIGURE 2 shows the completed grommet on an enlarged scale.

Referring more particularly to the drawings reference numeral 2 indicates a length of flexible material which is shown as a strand or wire rope. In most instances the rope will be made of steel. In making the grommet of my invention I provide a length of wire rope 2 which has a length greater than three times the desired circumference of the grommet. Two loops of substantially equal length are then formed in the rope 2. This is preferably done by applying a mark 4 adjacent a first end 6 of the rope, a second mark 7 substantially the distance of the grommet circumference from the mark 4 and a third mark 8 a distance substantially equal to the grommet circumference from the second mark 7. The rope 2 is then bent as shown in FIGURE 1 to form a first loop 10 and a second loop 12 with the rope being tied together at the marks by means of a tie wire 14. It will be seen that the end 6 passes over the loop 12 downwardly to the loop 10 with the end of the loop 10 adjacent the end 6 being beneath the second end of loop 10 and that the first end of loop 12 (the end adjacent mark 7) is beneath the second end thereof. The second end 16 of rope 2 beyond the mark 8 has a length substantially greater than the circumference of the grommet. The loops 10 and 12 are arranged generally parallel to each other such as by bending the outer ends of the loops downwardly from the position shown in FIGURE 1. The braiding is then started by passing the end 16 over the second loop 12 as shown in FIGURE 1, then beneath the first loop 10 over the first loop and beneath the second loop. These operations are then repeated until the braiding is completed. The terms "over" and "under" as used herein do not necessarily relate to the relationship to the earth since the two loops 10 and 12 might be turned from a generally vertical position with the braiding being otherwise the same. The ends 6 and 16 are then fastened together by means of a ferrule or sleeve 18. However, for greater flexibility it would be advisable to splice the two ends together. Since it is very difficult to have the exact length of material necessary for the braiding and connecting of the ends the length of rope 2 is selected to be greater than that absolutely necessary and any excess material is cut off from the ends after braiding.

While one embodiment of my invention has been shown and described, it will be apparent that other adaptations and modifications may be made without departing from the scope of the following claims.

I claim:

1. The method of making a three part braided grommet which comprises providing a length of flexible material longer than three times the desired circumference of the grommet, forming a first loop with first and second ends in said material starting with its first end adjacent the end of the material, forming a second loop in said material starting with its first end adjacent the end of said first loop, arranging the loops side by side with the first end of the first loop below the second end thereof and the first end of the second loop below the second end thereof, braiding the sections of the material together by passing the length of material beyond the second loop over the second loop, beneath the first loop, over the first loop, beneath the second loop and repeating the operation until the braiding is completed, removing any excess of material from its ends, and then fastening the ends together.

2. The method of making a three part braided grommet which comprises providing a length of flexible material longer than three times the desired circumference of the grommet, providing a mark on said material adjacent the first end thereof, providing a second mark on said material substantially the distance of the grommet circumference from said first mark, providing a third mark on said material substantially the distance of the grommet circumference from said second mark, forming a first loop of material between the first and second marks, forming a second loop of material between the second and third marks, fastening the material together at said marks with the two loops substantially parallel and with the said first end passing over the second loop and below the first loop adjacent the marks, braiding the sections of the material together by passing the length of material beyond the second loop over the second loop, beneath the first loop, over the first loop, beneath the second loop and repeating the operation until the braiding is completed, removing any excess of material from its ends, and then fastening the ends together.

3. A grommet comprising a single length of stranded wire structure divided into three substantially equal parts wire structure braided together with one of said parts passing alternately over and beneath the other two parts, and means fastening the ends of the stranded wire structure together.

References Cited in the file of this patent

UNITED STATES PATENTS

| 1,429,124 | Beyea | Sept. 12, 1922 |
| 1,522,798 | Beyea | Jan. 13, 1925 |
| 1,686,155 | Hopkins | Oct. 2, 1928 |
| 1,903,925 | Johnson | Apr. 18, 1933 |
| 2,081,096 | Reed | May 18, 1937 |

FOREIGN PATENTS

| 281,231 | Great Britain | Mar. 22, 1928 |
| 784,600 | France | Apr. 29, 1935 |